United States Patent [19]

Baum et al.

[11] Patent Number: 5,802,044
[45] Date of Patent: Sep. 1, 1998

[54] MULTICARRIER REVERSE LINK TIMING SYNCHRONIZATION SYSTEM, DEVICE AND METHOD

[75] Inventors: Kevin Baum, Rolling Meadows; James Robert Kelton, Oakpark; Phillip David Rasky, Buffalo Grove, all of Ill.

[73] Assignee: Motorola, Inc., Schaumburg, Ill.

[21] Appl. No.: 639,155

[22] Filed: Apr. 26, 1996

[51] Int. Cl.$^6$ ............................................. H04J 3/16
[52] U.S. Cl. .................. 370/330; 370/337; 370/344; 370/347; 370/350; 370/447; 455/69; 375/362
[58] Field of Search .......................... 370/310, 321, 370/324, 337, 344, 345, 347, 348, 350, 330; 375/316, 340, 344, 354, 362, 365, 371, 375; 379/56, 58–61; 455/39, 49.1, 53.1, 54.1, 56.1, 67.1, 68, 69

[56] References Cited

U.S. PATENT DOCUMENTS

| | | | |
|---|---|---|---|
| 5,434,905 | 7/1995 | Maeda et al. | 370/350 |
| 5,509,016 | 4/1996 | Muller | 370/350 |
| 5,617,410 | 4/1997 | Matsumoto | 370/350 |
| 5,638,361 | 6/1997 | Ohlson et al. | 370/350 |
| 5,640,396 | 6/1997 | Cudak et al. | 370/350 |
| 5,684,794 | 11/1997 | Lopez et al. | 370/337 |

OTHER PUBLICATIONS

"Mobile Radio Communications", Raymond Steele (Ed), Pentech Press Limited, London 1992, pp. 43–45, 68, 69.
"Digital Cellular Radio", George Calhoun, Artech House, Inc. Norwood, MA, 1988, pp. 277, 286, 288.
"Multicarrier Modulation for Data Transmission: An Idea Whose Time Has Come", John A. C. Bingham, May 1990—IEEE Communications Magazine, pp. 5–8, 11–14.
"Analysis and Simulation of a Digital Mobile Channel Using Orthoganal Frequency Division Multiplexing", Leonard J. Cimini, Jr IEEE Transactions on communications, vol. Con–33, No. 7, Jul. 1985, pp. 665–675.
"Frequency Synchronization Algorithms for OFDM Systems suitable for Communication over Frequency Selective Fading Channels", Ferdinand Classen, Heinrich Meyer, 1994 IEEE, p. 16551659.

*Primary Examiner*—Benedict V. Safourek
*Assistant Examiner*—Seema S. Rao
*Attorney, Agent, or Firm*—Darleen J. Stockley

[57] ABSTRACT

The present invention provides a communication system, device and method of reverse link symbol timing synchronization of transmited signals to facilitate reverse link timing synchronization. A base unit transmits a forward link signal, receives a reverse link signal, and determines a timing offset for signals received on a reverse link timing synchronization channel, wherein the reverse link synchronization channel comprises a plurality of adjacent reverse link carrier frequencies that are utilized by a multicarrier subscriber unit to facilitate reverse link symbol timing synchronization. A plurality of multicarrier subscriber units receive a forward link signal and transmit a reverse link symbol timing synchronization burst on a reverse link timing synchronization channel wherein the reverse link timing synchronization channel comprises a plurality of adjacent reverse link carrier frequencies that are utilized by each subscriber unit, and adjusts a timing reference for transmitting signals to facilitate reverse link timing synchronization.

25 Claims, 4 Drawing Sheets

FIG. 9

MULTICARRIER REVERSE LINK TIMING SYNCHRONIZATION SYSTEM, DEVICE AND METHOD

FIELD OF THE INVENTION

The present invention relates generally to communication systems and, in particular, to bandwidth efficient, multiple user two-way communication systems.

BACKGROUND OF THE INVENTION

Communication systems are known to comprise a plurality of subscriber units that communicate with one or more base or headend units via signals communicated over the air or over a wireline network. One such communication system is a two-way wireless communication system. In a two-way wireless communication system, a service access point is provided by a base unit which commonly includes a transmitter and receiver, or transceiver. The base unit may provide connectivity to another network such as the Public Switched Telephone Network, commonly referred to as the PSTN. Remote service connection is provided by a device referred to as a subscriber unit (Su), since service access is often subscription-based. These subscriber units may be mobile transceivers often consisting of handheld "telephone-like" devices which communicate with the base units via the RF spectrum. Each subscriber unit conveys information to the base unit by transmitting a signal to the base unit. The signal transmitted by a subscriber unit to the base unit may be referred to as a reverse link signal, or uplink signal. The base unit conveys information to each subscriber unit by transmitting a signal which may be referred to as a forward link signal or downlink signal.

As the use of wireless communication systems continues to expand, more of the available RF spectrum is becoming occupied. Therefore, it is desirable for modern communication systems to be bandwidth-efficient. Orthogonal Frequency Division Multiplexing (OFDM) is a multicarrier modulation method known in the art which allows a high rate digital data stream to be divided into a set of lower rate digital data streams, each of which are modulated onto a separate data carrier signal. The modulated data carrier signals have distinct carrier frequencies, but the carrier frequencies are closely spaced such that the spectra of adjacent modulated data carrier signals have significant overlap, as is known in the art.

Because of good bandwidth efficiency potential and robustness to certain types of channel impairments, OFDM is currently utilized in broadcast and wireline applications, including but not limited to Digital Audio Broadcasting (DAB) and wireline modems. Moreover, OFDM is usable for the forward link of multiple user two-way communication systems. In these applications, the relationship between the multiple modulated data carrier signals can be controlled easily (using the Discrete Fourier Transform, for example) since they are all generated within a single transmitter unit. In the case of DAB, the modulated data carrier signals are generated within a single transmit source, summed, and broadcasted simultaneously. In the case of a communication system forward link, the modulated data carrier signals are generated within a single base unit, summed, and transmitted simultaneously.

A need exists for a reverse link timing synchronization method which is well suited for systems having subscriber units which transmit (Tx) multicarrier reverse link signals.

DETAILED DESCRIPTION OF A PREFERRED EMBODIMENT

The present invention provides reverse link symbol timing synchronization method well suited for communication systems having bandwidth efficient spectrally overlapping transmissions on the reverse link, where multiple reverse link transmissions occur simultaneously from a plurality of subscriber units, hereinafter referred to as overlap bandwidth subscriber units because their reverse link signal frequency spectra may overlap.

Figure 1:
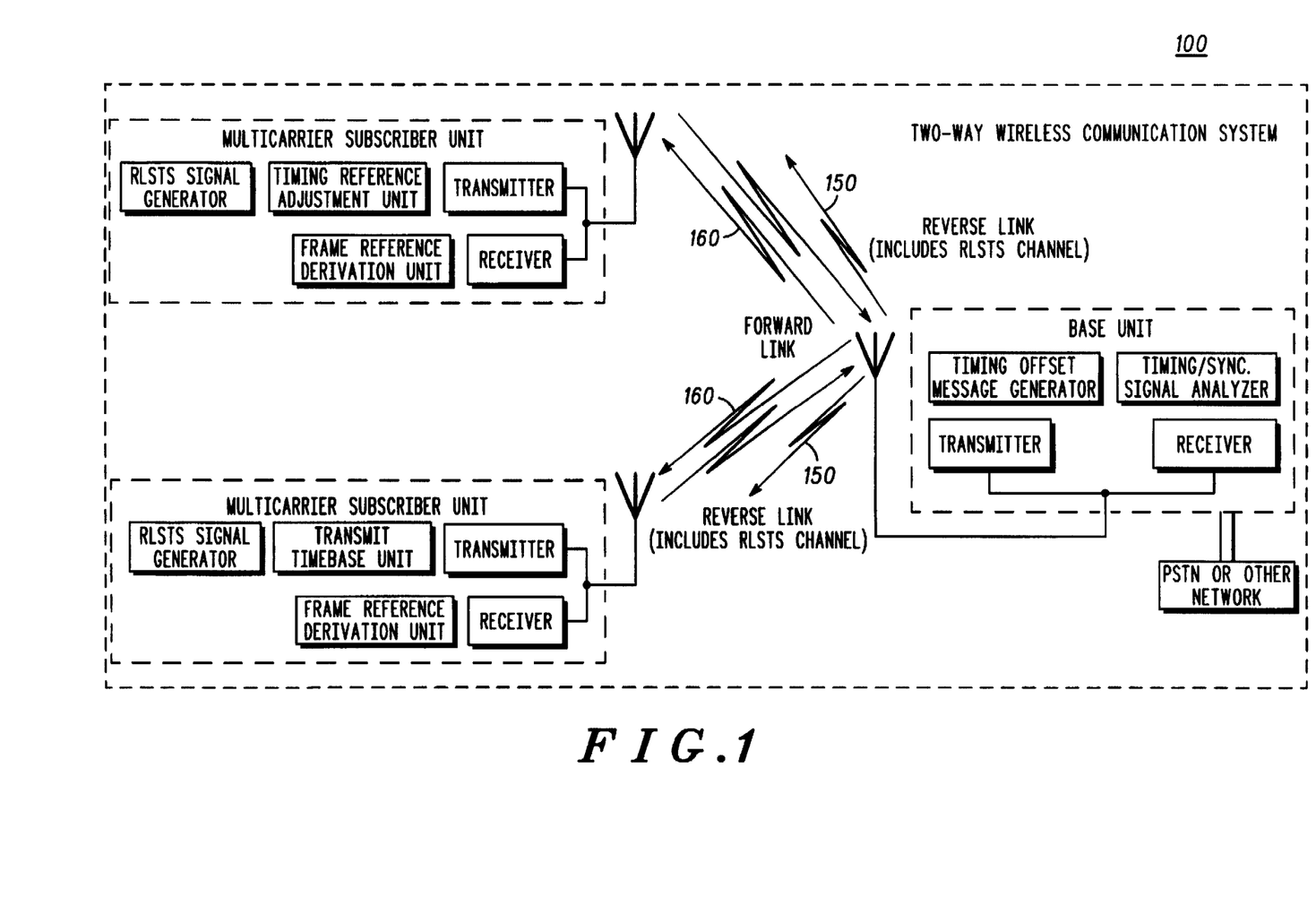
FIG. 1 is a schematic representation of a two-way communication system utilizing a reverse link symbol timing synchronization scheme in accordance with the present invention.

Mutual interference between the multiple transmitting overlap bandwidth subscriber units is avoided by controlling and coordinating the parameters of the transmit signals from the separate overlap bandwidth subscriber units. By allowing OFDM-like spectrally overlapping transmissions in the reverse link of the two-way communication system as in FIG. 1, numeral 100, the present invention enables the reverse link (150) of the two-way communication system to obtain bandwidth efficiency similar to that of the forward link (160) of the two-way communication system assuming OFDM is used in the forward link of the two-way communication system.

In the present invention, a reverse link symbol timing synchronization method which can be used in a system having a plurality of transmitting overlap bandwidth subscriber units on an OFDM-like spectrally overlapping reverse link is provided. Begin by considering the general case of a overlap bandwidth subscriber unit which is transmitting a reverse link signal. The reverse link signal is a digitally modulated signal that includes one or more modulated data carrier signals. A modulated data carrier signal is a carrier which is modulated by a digital information source in the transmitting unit, where the modulation method may comprise M-ary Quadrature Phase Shift Keying (M-PSK), M-ary Quadrature Amplitude Modulation (QAM), or other digital modulation method which may be known in the art. In OFDM, each of the carriers is commonly referred to as a subcarrier or a tone. A modulated data carrier signal has an associated carrier frequency, symbol time reference, and symbol pulse-shape function. The symbol time reference determines the symbol timing when a reverse link transmission occurs. The pulse-shape function for the modulating symbols on a modulated data carrier signal is selected from any of the known OFDM compatible pulse-shapes. The most common pulse-shape functions have a constant value over the pulse-shape function duration. If the pulse-shape function holds a constant value over the entire pulse-shape $$x(t) = A(t)e^{j\Phi(t)} \sum_{m=-\infty}^{+\infty} \sum_{k=0}^{N-1} x_{k,m} g_v[t-(m-1)T_s] e^{j2\pi k \frac{t}{t_s}}$$

Because all of the modulated data carrier signals comprising the OFDM signal have identical symbol time references and are spaced in frequency by $1/t_S$, any overlap bandwidth subscriber unit is able to detect the data on any of the modulated data carriers without interference from the other modulated data carriers. This detection is performed by integrating the received (Rx) OFDM signal over a constant time window of length $t_S$. The equation below shows the detection of the $n^{th}$ symbol in time by the $p^{th}$ overlap bandwidth subscriber unit given the reception of the OFDM signal, $x(t)$.

$$\hat{X}_{p,n} = \frac{1}{t_s} \int_{(n-1)T_s}^{(n-1)T_s+t_s} x(t) e^{-j2\pi p \frac{t}{t_s}} dt$$

$$= \frac{1}{t_s} \int_{(n-1)T_s}^{(n-1)T_s+t_s} A(t)e^{j\Phi(t)} \sum_{m=-\infty}^{+\infty} \sum_{k=0}^{N-1} X_{k,m} g_v[t-(m-1)T_s] e^{j2\pi(k-p)\frac{t}{t_s}} dt$$

$$= \frac{1}{t_s} \sum_{k=0}^{N-1} \int_{(n-1)T_s}^{(n-1)T_s+t_s} \sum_{m=-\infty}^{+\infty} A_n e^{j\Phi_n} X_{k,m} g_v[t-(m-1)T_s] e^{j2\pi(k-p)\frac{t}{t_s}} dt$$

$$= \frac{1}{t_s} \sum_{k=0}^{N-1} \int_{(n-1)T_s}^{(n-1)T_s+t_s} A_n e^{j\Phi_n} X_{k,n} e^{j2\pi(k-p)\frac{t}{t_s}} dt$$

$$= \frac{1}{t_s} \int_{(n-1)T_s}^{(n-1)T_s+t_s} A_n e^{j\Phi_n} X_{p,n} dt$$

$$= A_n e^{j\Phi_n} X_{p,n}$$

duration, the function is commonly referred to as a rectangular pulse-shape function. A preferred embodiment of a pulse shape function, $g_v(t)$, is defined in the following equation.

$$g_v(t) = \begin{cases} 1 & 0 \leq t \leq [T_s = (1+\Delta)t_s] \\ 0 & \text{else} \end{cases}$$

In this pulse shape definition, the portion of the pulse shape from 0 to $t_S$ is hereinafter referred to the useful symbol portion, and $t_S$ is hereinafter referred to as the useful symbol duration. The portion of the pulse shape from $t_S$ to $T_S$ is a symbol extension portion commonly referred to as a cyclic extension, periodic extension, or guard interval. The cyclic extension portion may be placed before the useful symbol portion instead of after the useful symbol portion, and in this case may also be referred to as a cyclic prefix. A cyclic extension is sometimes used in OFDM to improve performance in the presence of a multipath channel.

Consider an OFDM signal based on the defined pulse shape. In a preferred embodiment, this signal may transmitted on a forward link by a single base unit to a plurality of overlap bandwidth subscriber units. The following equation shows an OFDM signal, x(t), based on the defined pulse shape function, $g_v(t)$. The number of subcarriers used for transmission is given by N. Transmitted symbols are given by $x_{k,m}$ and channel attenuation and phase rotation are given by $A(t)e^{j\Phi(t)}$.

Now consider the case where the modulated data carrier signals are from two separate overlap bandwidth subscriber units, each of which simultaneously transmits a reverse link signal that has a modulated data carrier signal, with each modulated data carrier signal having a distinct carrier frequency, but with overlapping signal spectra. In this case since the overlap bandwidth subscriber units are physically separated, they contain separate local frequency, time, and phase references. These local references are commonly based on a local oscillator contained within each overlap bandwidth subscriber unit. Also note that the attenuation and phase rotation of the second overlap bandwidth subscriber unit reverse link signal may differ from the first due to propagation path differences. A composite signal received at the base unit that includes the sum of the reverse link signals from the two overlap bandwidth subscriber units may be written as shown in the following equation. The portion of the equation identified by k=0 corresponds to the signal transmitted on the first reverse link and the portion of the equation identified by k=1 corresponds to the signal transmitted on the second reverse link. Time references and local frequency references are represented by $\delta_k$ and $v_k$ respectively. Note that any propagation delay differences between the base unit and the two subscriber units are a part of the variable representing the Time reference since the equations represent the signals received at the base unit. Attenuations due to the channel are represented by $A_k(t)$ and phase rotations due to either the channel or local phase reference offsets are represented by $e^{j\Phi_k(t)}$.

$$x(t) = \sum_{m=-\infty}^{+\infty} \sum_{k=0}^{1} A_k(t)e^{j\Phi k(t)} X_{k,m} g_v[t-(m-1)T_s-\delta_k] e^{j2\pi(k+v_k)\frac{t}{t_s}}$$

the local frequency references goes to zero as shown in the following equation:

When the base unit attempts to detect the modulated data carrier from the first reverse link, there is generally interference from the second reverse link. This interference is caused by a mismatch between either the time references or the local frequency references of the two overlap bandwidth subscriber units. The following equation shows the detection of the $n^{th}$ symbol transmitted on the first reverse link assuming perfect synchronization of the time references and a mismatch between the local frequency references. Specifically, the two reverse link signals arrive at the base unit with identical symbol timing but are no longer spaced in frequency by an integer multiple of $1/t_S$. Mathematically, $\delta_0=0$, $\delta_1=0$, $v_0=0$, and $v_1 \neq 0$.

$$\hat{X}_{0,n} = \frac{1}{t_s} \int_{(n-1)T_s}^{(n-1)T_s+t_s} x(t) dt$$

$$= \frac{1}{t_s} \int_{(n-1)T_s}^{(n-1)T_s+t_s} \sum_{m=-\infty}^{+\infty} \sum_{k=0}^{1} A_k(t) e^{j\Phi k(t)} X_{k,m} g_v[t-(m-1)T_s] e^{j2\pi(k+v_k)\frac{t}{t_s}} dt$$

$$= \frac{1}{t_s} \sum_{k=0}^{1} \int_{(n-1)T_s}^{(n-1)T_s+t_s} \sum_{m=-\infty}^{+\infty} A_{k,n} e^{j\Phi_{k,n}} X_{k,m} g_v[t-(m-1)T_s] e^{j2\pi(k+v_k)\frac{t}{t_s}} dt$$

$$= \frac{1}{t_s} \sum_{k=0}^{1} \int_{(n-1)T_s}^{(n-1)T_s+t_s} A_{k,n} e^{j\Phi_{k,n}} X_{k,n} e^{j2\pi(k+v_k)\frac{t}{t_s}} dt$$

$$= \frac{1}{t_s} \int_{(n-1)T_s}^{(n-1)T_s+t_s} A_{0,n} e^{j\Phi_{0,n}} X_{0,n} dt + \frac{1}{t_s} \int_{(n-1)T_s}^{(n-1)T_s+t_s} A_{1,n} e^{j\Phi_{1,n}} e^{j2\pi(1+v_1)\frac{t}{t_s}} dt$$

$$= A_{0,n} e^{j\Phi_{0,n}} X_{0,n} + \frac{1}{t_s} A_{1,n} e^{j\Phi_{1,n}} X_{1,n} \frac{t_s}{j2\pi(1+v_1)} \left[ e^{j2\pi(1+v_1)\frac{t}{t_s}} \right]_{(n-1)T_s}^{(n-1)T_s+t_s}$$

$$= A_{0,n} e^{j\Phi_{0,n}} X_{0,n} + A_{1,n} e^{j\Phi_{1,n}} X_{1,n} \frac{1}{j2\pi(1+v_1)} \left[ e^{j2\pi \frac{(n-1)T_s+t_s}{t_s}} e^{j2\pi v_1 \frac{(n-1)T_s+t_s}{t_s}} - e^{j2\pi \frac{(n-1)T_s}{t_s}} e^{j2\pi v_1 \frac{(n-1)T_s}{t_s}} \right]$$

$$= A_{0,n} e^{j\Phi_{0,n}} X_{0,n} + A_{1,n} e^{j\Phi_{1,n}} X_{1,n} \frac{1}{j2\pi(1+v_1)} e^{j2\pi \frac{(n-1)T_s}{t_s}} e^{j2\pi v_1 \frac{(n-1)T_s}{t_s}} [e^{j2\pi v_1} - 1]$$

$$= A_{0,n} e^{j\Phi_{0,n}} X_{0,n} + A_{1,n} e^{j\Phi_{1,n}} X_{1,n} \frac{j e^{j2\pi(1+v_1)\frac{(n-1)T_s}{t_s}}}{2\pi(1+v_1)} [1 - e^{j2\pi v_1}]$$

Assuming perfect synchronization between the symbol timing of the signals received at the base unit, the interference term shown above disappears if the mismatch between $$[\hat{X}_{0,n}]_{v_1=0} = \left[ A_{0,n} e^{j\Phi_{0,n}} X_{0,n} + A_{1,n} e^{j\Phi_{1,n}} X_{1,n} \frac{j e^{j2\pi(1+v_1)\frac{(n-1)T_s}{t_s}}}{2\pi(1+v_1)} [1-e^{j2\pi v_1}] \right]_{v_1=0}$$

$$= A_{0,n} e^{j\Phi_{0,n}} X_{0,n} + A_{1,n} e^{j\Phi_{1,n}} X_{1,n} \frac{j e^{j2\pi(1+0)\frac{(n-1)T_s}{t_s}}}{2\pi(1+0)} [1-e^{j2\pi 0}]$$

$$= A_{0,n} e^{j\Phi_{0,n}} X_{0,n} + A_{1,n} e^{j\Phi_{1,n}} X_{1,n} \frac{j e^{j2\pi \frac{(n-1)T_s}{t_s}}}{2\pi} [1-1]$$

$$= A_{0,n} e^{j\Phi_{0,n}} X_{0,n}$$

Pertinent to the present invention, the equation below shows the detection of the $n^{th}$ symbol transmitted on the first reverse link assuming perfect synchronization between the two local frequency references and a mismatch between the time references. Specifically, the two reverse link signals arrive at the base unit spaced in frequency by an integer multiple of $1/t_s$, but without identical symbol timing. Mathematically, $v_0=0$, $v_1=0$, $\delta_0=0$, and $\delta_1 \neq 0$.

$$\hat{X}_{0,n} = \frac{1}{t_s} \int_{(n-1)T_s}^{(n-1)T_s+t_s} x(t)dt$$

$$= \frac{1}{t_s} \int_{(n-1)T_s}^{(n-1)T_s+t_s} \sum_{m=-\infty}^{+\infty} \sum_{k=0}^{1} A_k(t) e^{j\Phi_k(t)} X_{k,m} g_v[t-(m-1)T_s - \delta_k] e^{j2\pi k \frac{t}{t_s}} dt$$

$$= \frac{1}{t_s} \sum_{k=0}^{1} \int_{(n-1)T_s}^{(n-1)T_s+t_s} \sum_{m=-\infty}^{+\infty} A_{k,n} e^{j\Phi_{k,n}} X_{k,m} g_v[t-(m-1)T_s - \delta_k] e^{j2\pi k \frac{t}{t_s}} dt$$

$$= \frac{1}{t_s} \int_{(n-1)T_s}^{(n-1)T_s+t_s} \sum_{m=-\infty}^{+\infty} A_{0,n} e^{j\Phi_{0,n}} X_{0,m} g_v[t-(m-1)T_s]dt + \frac{1}{t_s} \int_{(n-1)T_s}^{(n-1)T_s+t_s} \sum_{m=-\infty}^{+\infty} A_{1,n} e^{j\Phi_{1,n}} X_{1,m} g_v[t-(m-1)T_s - \delta_1] e^{j2\pi \frac{t}{t_s}} dt$$

$$= \frac{1}{t_s} \int_{(n-1)T_s}^{(n-1)T_s+t_s} A_{0,n} e^{j\Phi_{0,n}} X_{0,n} dt + \frac{1}{t_s} \int_{(n-1)T_s}^{(n-1)T_s+t_s} \sum_{m=-\infty}^{+\infty} A_{1,n} e^{j\Phi_{1,n}} X_{1,m} g_v[t-(m-1)T_s - \delta_1] e^{j2\pi \frac{t}{t_s}} dt$$

$$= A_{0,n} e^{j\Phi_{0,n}} X_{0,n} + \frac{1}{t_s} \int_{(n-1)T_s}^{(n-1)T_s+t_s} \sum_{m=-\infty}^{+\infty} A_{1,n} e^{j\Phi_{1,n}} X_{1,m} g_v[t-(m-1)T_s - \delta_1] e^{j2\pi \frac{t}{t_s}} dt$$

Depending on the value of $\delta_1$, the equation for the detection of the of the $n^{th}$ symbol takes on one of three forms.

CASE 1: $-T_s < \delta_1 < -T_s + t_s$ $$\hat{X}_{0,n} = A_{0,n} e^{j\Phi_{0,n}} X_{0,n} + \frac{1}{t_s} \int_{(n-1)T_s}^{(n-1)T_s+t_s} \sum_{m=-\infty}^{+\infty} A_{1,m} e^{j\Phi_{1,m}} X_{1,m} g_v[t-(m-1)T_s - \delta_1] e^{j2\pi \frac{t}{t_s}} dt$$

$$= A_{0,n} e^{j\Phi_{0,n}} X_{0,n} + \frac{1}{t_s} \int_{(n-1)T_s}^{nT_s+\delta_1} A_{1,n} e^{j\Phi_{1,n}} X_{1,n} e^{j2\pi \frac{t}{t_s}} dt + \frac{1}{t_s} \int_{nT_s+\delta_1}^{(n-1)T_s+t_s} A_{1,n+1} e^{j\Phi_{1,n+1}} X_{1,n+1} e^{j2\pi \frac{t}{t_s}} dt$$

$$= A_{0,n} e^{j\Phi_{0,n}} X_{0,n} + \frac{1}{t_s} A_{1,n} e^{j\Phi_{1,n}} X_{1,n} \frac{t_s}{j2\pi} \left[ e^{j2\pi \frac{t}{t_s}} \right]_{(n-1)T_s}^{nT_s+\delta_1} + \frac{1}{t_s} A_{1,n+1} e^{j\Phi_{1,n+1}} X_{1,n+1} \frac{t_s}{j2\pi} \left[ e^{j2\pi \frac{t}{t_s}} \right]_{nT_s+\delta_1}^{(n-1)T_s+t_s}$$

$$= A_{0,n} e^{j\Phi_{0,n}} X_{0,n} + A_{1,n} e^{j\Phi_{1,n}} X_{1,n} \frac{1}{j2\pi} \left[ e^{j2\pi \frac{nT_s}{t_s}} e^{j2\pi \frac{\delta_1}{t_s}} - e^{j2\pi \frac{nT_s}{t_s}} e^{-j2\pi \frac{T_s}{t_s}} \right] +$$

$$A_{1,n+1} e^{j\Phi_{1,n+1}} X_{1,n+1} \frac{1}{j2\pi} \left[ e^{j2\pi \frac{nT_s}{t_s}} e^{-j2\pi \frac{T_s}{t_s}} e^{j2\pi} - e^{j2\pi \frac{nT_s}{t_s}} e^{j2\pi \frac{\delta_1}{t_s}} \right]$$

$$= A_{0,n} e^{j\Phi_{0,n}} X_{0,n} + A_{1,n} e^{j\Phi_{1,n}} X_{1,n} \frac{j e^{j2\pi \frac{nT_s}{t_s}}}{2\pi} \left[ e^{-j2\pi \frac{T_s}{t_s}} - e^{j2\pi \frac{\delta_1}{t_s}} \right] + A_{1,n+1} e^{j\Phi_{1,n+1}} X_{1,n+1} \frac{j e^{j2\pi \frac{nT_s}{t_s}}}{2\pi} \left[ e^{j2\pi \frac{\delta_1}{t_s}} - e^{j2\pi \frac{T_s}{t_s}} \right]$$

CASE 2: $-T_s + t_s < \delta_1 < 0$ $$\hat{X}_{0,n} = A_{0,n}e^{j\Phi_{0,n}}X_{0,n} + \frac{1}{t_s}\int_{(n-1)T_s}^{(n-1)T_s+t_s} \sum_{m=-\infty}^{+\infty} A_{1,m}e^{j\Phi_{1,m}}X_{1,m}g_v[t-(m-1)T_s-\delta_1]e^{j2\pi\frac{t}{t_s}} dt$$

$$= A_{0,n}e^{j\Phi_{0,n}}X_{0,n} + \frac{1}{t_s}\int_{(n-1)T_s}^{(n-1)T_s+t_s} A_{1,n}e^{j\Phi_{1,n}}X_{1,n}e^{j2\pi\frac{t}{t_s}} dt$$

$$= A_{0,n}e^{j\Phi_{0,n}}X_{0,n} + \frac{1}{t_s}A_{1,n}e^{j\Phi_{1,n}}X_{1,n}\frac{t_s}{j2\pi}\left[e^{j2\pi\frac{t}{t_s}}\right]_{(n-1)T_s}^{(n-1)T_s+t_s}$$

$$= A_{0,n}e^{j\Phi_{0,n}}X_{0,n} + A_{1,n}e^{j\Phi_{1,n}}X_{1,n}\frac{1}{j2\pi}\left[e^{j2\pi\frac{(n-1)T_s}{t_s}}e^{j2\pi} - e^{j2\pi\frac{(n-1)T_s}{t_s}}\right]$$

$$= A_{0,n}e^{j\Phi_{0,n}}X_{0,n} + A_{1,n}e^{j\Phi_{1,n}}X_{1,n}\frac{1}{j2\pi}\left[e^{j2\pi\frac{(n-1)T_s}{t_s}} - e^{j2\pi\frac{(n-1)T_s}{t_s}}\right]$$

$$= A_{0,n}e^{j\Phi_{0,n}}X_{0,n}$$

CASE 3: $0 < \delta_1 < t_s$ $$\hat{X}_{0,n} = A_{0,n}e^{j\Phi_{0,n}}X_{0,n} + \frac{1}{t_s}\int_{(n-1)T_s}^{(n-1)T_s+t_s} \sum_{m=-\infty}^{+\infty} A_{1,m}e^{j\Phi_{1,m}}X_{1,m}g_v[t-(m-1)T_s-\delta_1]e^{j2\pi\frac{t}{t_s}} dt$$

$$= A_{0,n}e^{j\Phi_{0,n}}X_{0,n} + \frac{1}{t_s}\int_{(n-1)T_s}^{(n-1)T_s+\delta_1} A_{1,n-1}e^{j\Phi_{1,n-1}}X_{1,n-1}e^{j2\pi\frac{t}{t_s}} dt + \frac{1}{t_s}\int_{(n-1)T_s+\delta_1}^{(n-1)T_s+t_s} A_{1,n}e^{j\Phi_{1,n}}X_{1,n}e^{j2\pi\frac{t}{t_s}} dt$$

$$= A_{0,n}e^{j\Phi_{0,n}}X_{0,n} + \frac{1}{t_s}A_{1,n-1}e^{j\Phi_{1,n-1}}X_{1,n-1}\frac{t_s}{j2\pi}\left[e^{j2\pi\frac{t}{t_s}}\right]_{(n-1)T_s}^{(n-1)T_s+\delta_1} + \frac{1}{t_s}A_{1,n}e^{j\Phi_{1,n}}X_{1,n}\frac{t_s}{j2\pi}\left[e^{j2\pi\frac{t}{t_s}}\right]_{(n-1)T_s+\delta_1}^{(n-1)T_s+t_s}$$

$$= A_{0,n}e^{j\Phi_{0,n}}X_{0,n} + A_{1,n-1}e^{j\Phi_{1,n-1}}X_{1,n-1}\frac{1}{j2\pi}\left[e^{j2\pi\frac{(n-1)T_s}{t_s}}e^{j2\pi\frac{\delta_1}{t_s}} - e^{j2\pi\frac{(n-1)T_s}{t_s}}\right] +$$

$$A_{1,n}e^{j\Phi_{1,n}}X_{1,n}\frac{1}{j2\pi}\left[e^{j2\pi\frac{(n-1)T_s}{t_s}}e^{j2\pi} - e^{j2\pi\frac{(n-1)T_s}{t_s}}e^{j2\pi\frac{\delta_1}{t_s}}\right]$$

$$= A_{0,n}e^{j\Phi_{0,n}}X_{0,n} + A_{1,n-1}e^{j\Phi_{1,n-1}}X_{1,n-1}\frac{je^{j2\pi\frac{(n-1)T_s}{t_s}}}{2\pi}\left[1-e^{j2\pi\frac{\delta_1}{t_s}}\right] + A_{1,n}e^{j\Phi_{1,n}}X_{1,n}\frac{je^{j2\pi\frac{(n-1)T_s}{t_s}}}{2\pi}\left[e^{j2\pi\frac{\delta_1}{t_s}}-1\right]$$

These three cases for the detection of the $n^{th}$ symbol from the first overlap bandwidth subscriber unit may be summarized as shown below.

$$\hat{X}_{0,n} = A_{0,n}e^{j\Phi_{0,n}}X_{0,n} + \begin{cases} A_{1,n}e^{j\Phi_{1,n}}X_{1,n}\frac{je^{j2\pi\frac{nT_s}{t_s}}}{2\pi}\left[e^{-j2\pi\frac{T_s}{t_s}} - e^{j2\pi\frac{\delta_1}{t_s}}\right] + \\ A_{1,n+1}e^{j\Phi_{1,n+1}}X_{1,n+1}\frac{je^{j2\pi\frac{nT_s}{t_s}}}{2\pi}\left[e^{-j2\pi\frac{\delta_1}{t_s}} - e^{j2\pi\frac{T_s}{t_s}}\right] & -T_s < \delta_1 < -T_s+t_s \\ 0 & -T_s+t_s < \delta_1 < 0 \\ A_{1,n-1}e^{j\Phi_{1,n-1}}X_{1,n-1}\frac{je^{j2\pi\frac{(n-1)T_s}{t_s}}}{2\pi}\left[1-e^{j2\pi\frac{\delta_1}{t_s}}\right] + \\ A_{1,n}e^{j\Phi_{1,n}}X_{1,n}\frac{je^{j2\pi\frac{(n-1)T_s}{t_s}}}{2\pi}\left[e^{j2\pi\frac{\delta_1}{t_s}}-1\right] & 0 < \delta_1 < t_s \end{cases}$$

Note that the interference term in the above equation disappears as the mismatch in symbol timing approaches zero. Note that the use of a cyclic extension eases the equality requirement for the symbol timing of the two reverse link transmissions. The timing references may differ by an amount as large as the cyclic extension duration. In other words, the requirement on the symbol timing of the second reverse link signal is $-\Delta t_S < \delta_1 < 0$ for it not to interfere with the first reverse link signal.

While the preceding analysis was shown for a single modulated data carrier from each of two overlap bandwidth subscriber units with a carrier spacing near $1/t_S$, the analysis is also applicable to scenarios with more than two overlap bandwidth subscriber units and carrier spacings near any integer multiple of $1/t_S$.

In order to avoid mutual interference, the local frequency reference and symbol time reference of each overlap bandwidth subscriber unit must be controlled in a predetermined manner by the communication system. The frequency reference requirement is that the modulated data carrier frequencies be spaced by integer multiples of $1/t_S$. The time reference requirement is that all reverse link signals arrive at the base unit with the same symbol timing, which means that the beginning of a received symbol is at the same timing phase relative to a base unit symbol clock regardless of which subscriber unit transmitted the symbol. Note that as the previous equations show, differences in the amplitudes and phases of the reverse link signals arriving at the base unit do not cause interference if the frequency and symbol timing parameters are properly controlled. The prior analysis indicates that a bandwidth-efficient multiple user reverse link may be implemented by utilizing a frequency spacing of as little as $1/t_S$ between the modulated data carriers from separate overlap bandwidth subscriber unit reverse link signals, and that mutual interference can be avoided even though the spectra of the reverse link signals overlap.

The present invention addresses the symbol timing synchronization aspect by providing a reverse link symbol timing synchronization (RLSTS) method. Although the previous set of equations indicate the importance of reverse link symbol timing synchronization in a system with overlap bandwidth subscriber units, the present invention is also very beneficial in systems with multicarrier reverse link signals even when the reverse link signal spectra from different subscriber units do not overlap. The present invention, by providing timing synchronization of all reverse link signals, enables the base unit to be simplified significantly by enabling the base unit to use the same symbol sampling phase for detecting reverse link signals from all subscriber units. In a system which combines multicarrier modulation such as OFDM with Time Division Multiple Access (TDMA), the present invention allows the symbol sampling phase for detecting a reverse link signal to remain the same for all received TDMA time slots.

Figure 3:
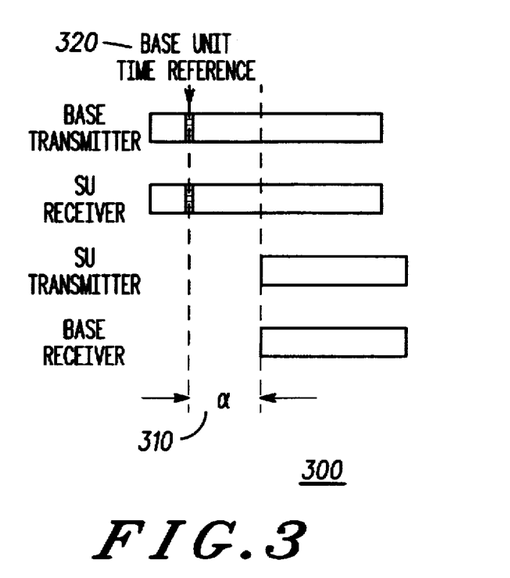
FIG. 3 is a schematic representation of a signal transmission and reception timing diagram of a two-way communication system in the absence of propagation delay.
Figure 4:
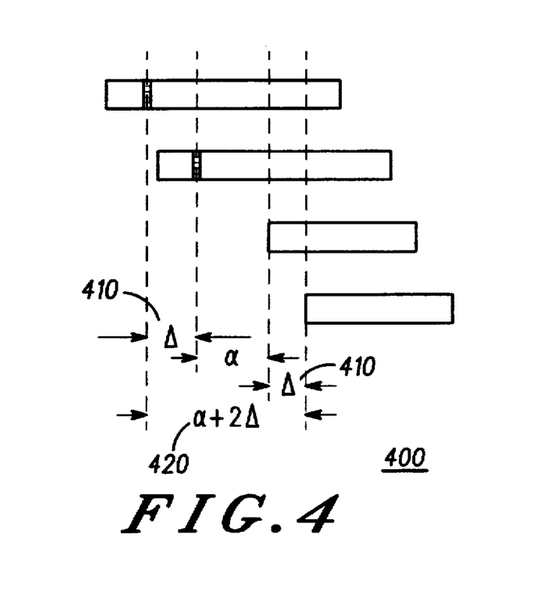
FIG. 4 is a schematic representation of a signal transmission and reception timing diagram of a two-way communication system in the presence of propagation delay.

Note that in a TDMA based system, a subscriber unit typically obtains a received signal symbol, slot, and frame timing by monitoring a received forward link signal which is transmitted by the base unit. See FIG. 3, numeral 300. The reverse link slot and frame timing may be defined such that a reverse link frame begins at fixed time offset, $\alpha$ and numeral 310, from the beginning of a forward link frame where time is referenced to the base unit timebase or timing reference 320. In a situation where the subscriber unit is located relatively far from the base unit, a significant propagation delay can result as shown in FIG. 4, numeral 400. If the subscriber unit uses the timing of the received forward link signal to determine the timing of its reverse link signal transmission, the propagation delay will result in a delay in the reverse link transmit timing reference of the subscriber unit as compared to the base unit timing reference. From reciprocity, the transmission path from the subscriber unit to the base unit will experience the same propagation delay. This propagation delay, $\Delta$ and numeral 410, will be given by $$\Delta = d/c$$

where d is the distance of the subscriber unit from the base unit, c is the speed of light free space ($3 \times 10^6$ m/s), and $\Delta$ is the propagation delay in seconds. Therefore, if a subscriber unit simply transmits a reverse link signal at a fixed offset from a reference timing obtained from the forward link signal, the time of arrival of the reverse link signal at the base unit will be $\alpha + 2\Delta$ (420) seconds compared to $\alpha$ (320) for a subscriber unit co-located with the base unit. The quantity $2\Delta$ is commonly referred to as the round trip propagation delay or simply the round trip delay. As an example, consider a subscriber unit located 3 km from the base unit. The round trip propagation delay for such a system would be 20 uSec. For an OFDM communication system in which the subscriber units may be relatively far from the base unit, any significant delays will cause a difference in the symbol timing of signals received at the base unit from the distant and the co-located subscriber units. As shown in the previous equations, this misalignment will cause mutual interference. While it is possible through the use of large cyclic extensions to mitigate the effect of such delays, this is not desirable in many cases because the use of a longer cyclic extension will result in reduced system bandwidth efficiency. The present invention provides, for a multicarrier communication system, a method for adjusting the symbol timing reference of each subscriber unit such that the reverse link signals from different subscriber units arrive at the base unit with the same symbol timing. Having the same symbol timing means that the beginning of a received symbol is at the same timing phase relative to a base unit timebase/timing reference regardless of which of a plurality of subscriber unit transmitted the symbol.

Figure 5:
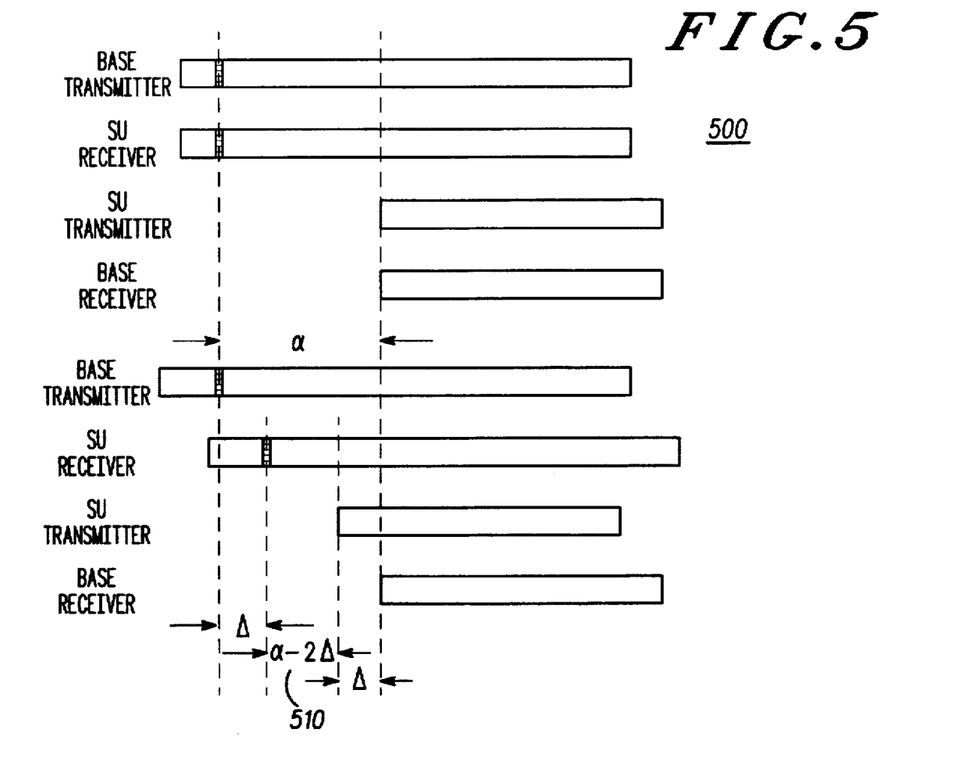
FIG. 5 is a schematic representation of a comparison of the signal transmission and reception timing diagram of FIG. 3 and the signal transmission and reception timing diagram of a communication system employing reverse link symbol timing synchronization in the presence of propagation delay.

More specifically, the present invention provides a multicarrier reverse link symbol timing synchronization (RLSTS) method. In a preferred embodiment of a system using the RLSTS method, a subscriber unit advances the transmission time of its reverse link signal by $2\Delta$ to remove the effect of propagation delay on the signal received by the base unit. This advance of the transmit timing will cause a reverse link signal transmitted from a distant subscriber unit to arrive at the base unit with the same symbol timing as one transmitted from a nearby subscriber unit as shown in FIG. 5, numeral 500. Note that the RLSTS method must acquire an estimate of the round trip propagation delay. Further, once known, the round trip propagation delay is preferably be tracked or updated periodically to maintain an accurate round trip delay estimate as the subscriber unit position changes relative to the base unit. Periodic updating of the RLSTS may also be beneficial when the subscriber unit is stationary because a drift of the subscriber unit timing reference may be perceived as a change in propagation delay, and hence may be corrected by the present invention.

The problems of initially acquiring and then tracking the round trip propagation delay are treated separately in a preferred embodiment of the present invention. A subscriber unit will initially acquire symbol and frame level timing from a forward link signal transmitted by a base station, as known in the art. After this timing is obtained, the subscriber unit will perform an initial RLSTS channel access, which includes formatting a RLSTS message for a RLSTS channel, and transmitting a RLSTS burst which contains the RLSTS message at a predetermined time on the reverse link. The predetermined time is preferably at a predetermined time offset α relative to a timing reference point in the signal received from the base unit. The RLSTS message is preferably a random or unique data code to differentiate a given subscriber unit from others which may attempt initial access at the same time. Because of round trip propagation delays, the initial RLSTS channel access burst will arrive at the base unit at a time 2Δ seconds later than it would if the subscriber unit was co-located with the base unit. The base unit measures the time offset between the known moment that an RLSTS burst would arrive from a co-located subscriber unit and the actual time of arrival to determine the round trip propagation delay. After determining the round trip delay, the base unit performs an RLSTS acknowledgment. The RLSTS acknowledgment process includes transmitting a RLSTS acknowledgment burst on the forward link containing a RLSTS acknowledgment message. The RLSTS message preferably includes the measured timing offset and the unique code which was received in the reverse link RLSTS burst. The unique code is preferably used to confirm the identity of the subscriber unit which transmitted the RLSTS burst. The subscriber unit, subsequent to receiving the RLSTS acknowledgment burst, advances subsequent transmission times by shortening the duration of α to α−2Δ (510), causing subsequent transmissions to arrive at the base unit with the same symbol timing as would be observed if the subscriber unit where co-located with the base unit.

The first step in the initial acquisition process is for the subscriber unit to ascertain the symbol timing of the signal received from the base unit using a method known in the art. This timing will be delayed by Δ relative to the time the signal was transmitted from the base unit. The subscriber unit must then derive the frame level timing of the forward link signal. This may also be accomplished by one of several methods known in the art, one such method being correlation to a predetermined pattern transmitted by the base unit at a predetermined point within each frame.

As described earlier, after the symbol and frame timing of the signal transmitted by the base unit has been determined by the subscriber unit, the subscriber unit performs an initial RLSTS channel access. The RLSTS burst is preferably transmitted at a predetermined time relative to the forward link frame timing.

Note that the RLSTS burst may not arrive at the base unit with proper symbol timing due to the round trip delay. To avoid interfering with modulated data carriers on nearby carrier frequencies several carriers on either side of the RLSTS burst are made a part of the RLSTS channel in the system. The particular number of such carriers will depend on system parameters such as modulation pulse shaping, carrier spacing, the susceptibility of the chosen modulation to interference, and the maximum tolerable error rate of the channel.

In a preferred embodiment, a subscriber unit does not communicate with the base unit prior to an initial RLSTS channel access. Therefore, the initial RLSTS channel access attempts are not coordinated between a plurality of subscriber units. Due to the absence of coordination, two or more subscriber units may attempt an RLSTS channel access at the same time. Such uncoordinated access is referred to as contention based. In contention based access, if one subscriber unit is much closer to the base unit than another, the signal from the close subscriber unit may be sufficiently strong to be properly received by the base unit, even in the presence of interference from the more remote unit. Note that neither the close in or far away subscriber unit has knowledge that the other has performed RLSTS channel access. Therefore, if the base unit RLSTS acknowledgment did not contain information identifying which subscriber unit the acknowledgment was intended for, both subscriber units would assume this message was in response to their RLSTS channel access, causing the far away unit to utilize the wrong round trip delay. In order to avoid this problem, the subscriber units preferably include a unique or randomly generated code word in the RLSTS message transmitted in the RLSTS burst, as mentioned earlier. When the base unit performs an RLSTS acknowledgment, both the unique code and the round trip delay estimate are included in the RLSTS acknowledgment message transmitted in the RLSTS acknowledgment burst. In the above case in which the nearby subscriber unit reverse link signal was captured, the RLSTS acknowledgment message would include the unique code from the nearby subscriber unit. The far away subscriber would ignore this data because the code would not match the code it had included in its RLSTS message. In this case the far away subscriber unit preferably performs an additional RLSTS channel access to facilitate RLSTS. A second scenario which can arise due to the lack of coordination between subscriber units occurs when two or more subscriber units perform RLSTS channel access at the same time and their signals arrive at the base unit with roughly equal power levels. In this case, the signals interfere with each other so badly that neither can be properly received. This situation is referred to as a collision. In this situation, the base unit preferably does not perform any RLSTS acknowledgment, or may detect and report the presence of a collision by detection of a high received signal strength. If both subscriber units simply note the lack of an RLSTS acknowledgment or a report of a collision and repeat the a RLSTS channel access, both will again attempt the access at the same time resulting in another collision. To avoid this situation, subscriber units preferably wait a randomly determined time period before repeating a RLSTS channel access. If the random window is sufficiently long, the probability of multiple collisions occurring becomes very small and the time required to complete the initial RLSTS process will be reasonably short even when an initial RLSTS channel access collision occurs. This approach to avoiding multiple collisions is similar to a method known as ALOHA commonly used in packet data systems.

When a RLSTS burst is received by the base unit, the symbol timing of the received signal is determined and compared to the desired symbol timing. In the present invention, with the exception of the RLSTS channel, all other reverse link signals in an OFDM system will be received with known symbol and slot timing. An OFDM demodulator can take advantage of this by using only 1 sample per symbol on these carriers in the demodulation process, greatly simplifying the hardware require for demodulation. However, this a-priori knowledge of the reverse link symbol timing is not present on the RLSTS channel.

Figure 6:
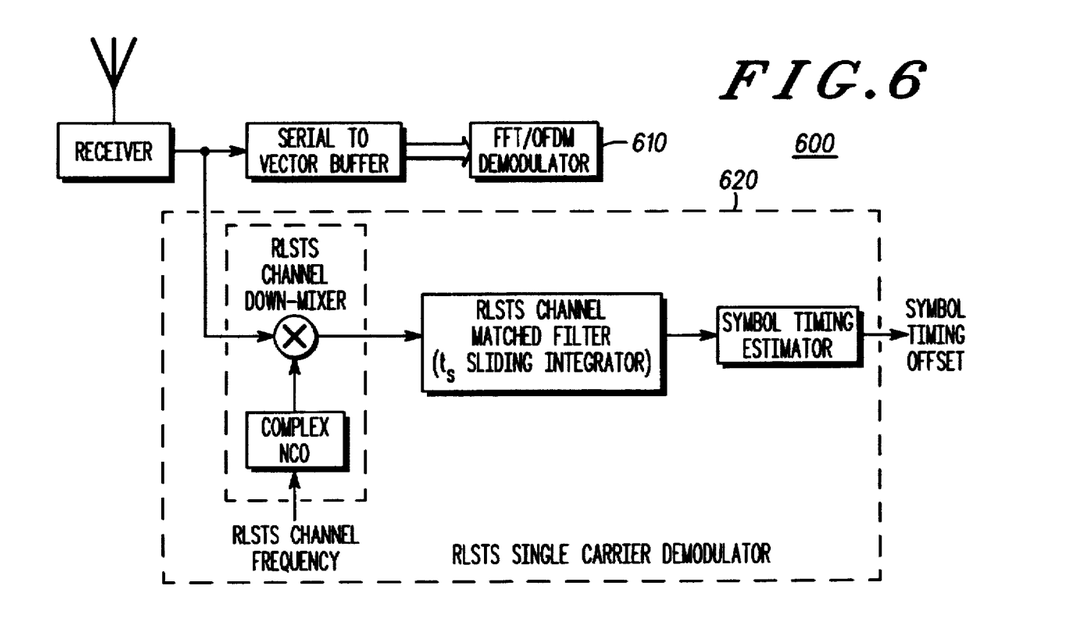
FIG. 6 is a block diagram illustrating a base unit which includes a reverse link symbol timing synchronization single carrier demodulator in accordance with the present invention.

In another preferred embodiment, the base unit demodulator includes an FFT based OFDM demodulator (610), and a separate demodulator (620) for demodulating reverse link signals on the RLSTS channel as shown in FIG. 6, numeral 600. This demodulator preferably operates at a high sampling rate such as 128 samples per symbol. Note that for the RLSTS channel format of FIG. 8, numeral 800, this receiver can be used to demodulate an initial access (IA) RLSTS burst or a tracking (Tr) RLSTS burst. Note that active traffic (Trf) channels can also occupy a portion of the tracking channel. This demodulator preferably includes a digital downconverter tuned to the carrier frequency of the RLSTS burst, a digital matched filter, where the digital matched filter is a sliding integrator in the case of rectangular symbol pulse shaped transmission, and a symbol timing estimator. One of the symbol timing recovery methods known in the art may be used to determine the symbol timing of reverse link RLSTS signals received on the RLSTS channel. After the symbol timing is determined, the difference between the actual arrival time and the desired arrival time is calculated. Further, the contents of the RLSTS burst are detected to extract the code word of the RLSTS message. This information is then concatenated and transmitted back to the subscriber unit using the RLSTS acknowledgment process described earlier.

After the subscriber unit receives the RLSTS acknowledgment from the base station and verifies that the code word within the RLSTS acknowledgment message matches that which the subscriber unit sent, the subscriber unit adjusts its transmit timing to compensate for the round trip delay. To overcome message transmission errors which may be introduced by a poor quality RF channel, the subscriber unit may preferably perform another RLSTS channel access to verify that the first RLSTS process produced the correct results. This may be accomplished preferably by updating the subscriber unit transmit timing as described above and verifying that the subsequent RLSTS channel access results in a RLSTS acknowledgment message having a timing adjustment value substantially close to zero.

The tracking mode of operation differs from the initial access mode in five significant ways. First, the symbol timing of the a signal will already be close enough to ideal to prevent interference with nearby carriers. This eliminates the need for multiple carriers in the RLSTS channel as was required in the initial access phase. Second, in order to continuously track the changes in the round trip delay due to subscriber unit motion, RLSTS is preferably performed on a recurring basis. Third, because communication with the base unit has been established prior to a tracking mode RLSTS channel access, these accesses in tracking mode are preferably scheduled a-priori by the base unit. The schedule of tracking mode RLSTS channel accesses is preferably communicated to the subscriber unit on the forward link. An example embodiment of a tracking mode update schedule is the assignment of slot number one in every tenth TDMA frame to a first subscriber unit, and the assignment of slot number two in every tenth TDMA frame to a second subscriber unit. There is no need to handle contention in the preferred tracking mode because no two subscriber units will attempt to access the RLSTS channel in tracking mode at the same time. Fourth, because the number of subscriber units actively using the communications channel is much larger than those attempting initial access most of the time and because the tracking mode requires periodic access, the frequency at which tracking mode accesses to the RLSTS channel occur will be much higher than that of the initial access mode. Finally, since the subscriber unit has already performed an initial timing adjustment based on an initial access RLSTS process, the timing offset measured by a base unit in a tracking mode RLSTS channel access is not a round trip propagation delay, but it is still equivalent to the amount of adjustment needed in the subscriber unit timing reference to make the round trip propagation delay appear to be zero at the base unit. The measured timing offset in the tracking mode may be referred to as an apparent round trip delay. While these differences are significant, the basic structure of the RLSTS process in the two different modes is very similar.

As in the initial access mode, the subscriber unit preferably derives forward link symbol, slot, and frame timing based on the forward link signal received from the base unit. The reverse link timing reference values will be offset according to the values determined by the initial access RLSTS process. The subscriber unit will access the RLSTS channel at predetermined, and preferably periodic, intervals and transmit a RLSTS burst. However, unlike an initial access RLSTS channel, the tracking RLSTS channel does not require guard carriers because it is known that the burst will arrive at the base unit within a small tolerance of the desired time of arrival. Therefore, the tracking RLSTS burst will not interfere with nearby data modulated carriers. The base unit must again determine the exact time of arrival of the RLSTS burst relative to the desired time of arrival and transmit this information to the subscriber unit with an RLSTS acknowledgment. If the RLSTS burst arrives earlier than the base unit desired timing, the base unit RLSTS acknowledgment will contain a negative apparent round trip delay value, so the subscriber unit will delay its timing reference. In the case where RLSTS burst arrives later than the base unit desired timing, the base unit RLSTS acknowledgment will contain a positive apparent round trip delay value, so the subscriber unit will advance its timing reference. Because the change in timing required in the tracking mode is small, the apparent round trip delay information may be quantified as a single bit, with the bit set to indicate a positive apparent round trip delay so that the subscriber unit will advance the transmission time by a small fraction of a symbol duration, denoted $\Delta t$, or cleared to indicate a negative apparent round trip delay so that the subscriber unit will delay its transmission time by $\Delta t$. This procedure is more robust in the presence of bit errors than transmission of the actual apparent round trip delay as a bit error can at most induce the transmission time of the subscriber unit to be in error by $2\Delta t$ instead of the full scale value of the transmission time window. It does however, require more frequent RLSTS channel accesses because it cannot, in general, change the transmission time by a large amount based on a single RLSTS channel access. Note that several variations to the single bit procedure are within the scope of the present invention, such as the transmission of 2 bits to allow 4 different possible transmission time adjustments to be made and the inclusion of a code to allow for no change in the transmission instant.

Figure 7:
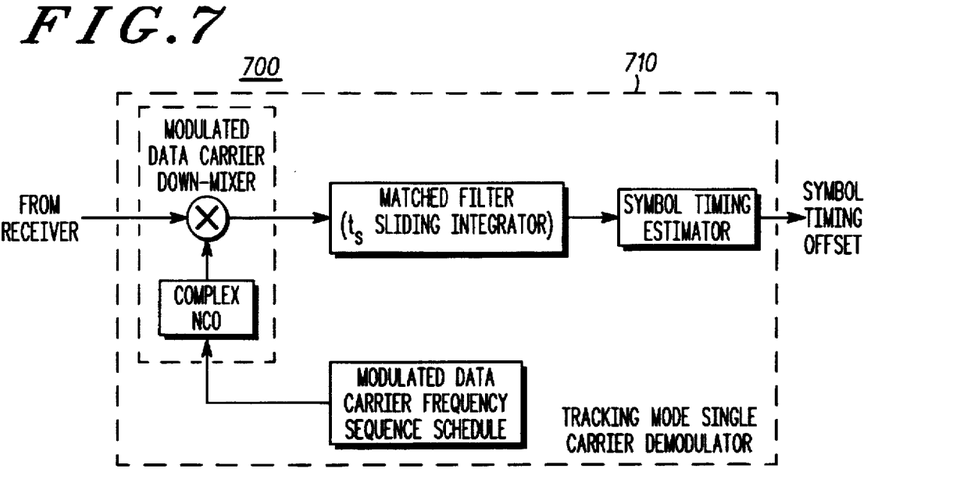
FIG. 7 is a block diagram illustrating a base unit which includes a tracking mode single carrier demodulator in accordance with the present invention.

In another preferred embodiment, the bandwidth efficiency of the reverse link is improved by using the only information bearing data modulated carriers of the reverse link signal for updates in the tracking mode. After initial timing synchronization has been obtained using one of the acquisition methods described earlier, a subscriber transmits information on the reverse link preferably using OFDM. Instead of having the subscriber unit transmit a RLSTS burst periodically as in the previous embodiment, the base unit utilizes one or more of the information bearing modulated data carriers of the reverse link signal for measuring symbol timing offset in the tracking mode. By utilizing an existing information bearing reverse link signal to measure symbol timing offset, the tracking mode RLSTS channel can be eliminated resulting in an improved system bandwidth efficiency. A preferred implementation of the present method in the base unit is as follows. The base unit includes one or more single carrier demodulators (710), each preferably implemented with a digital downconverter and digital matched filter, where the matched filter is a sliding rectangular window integrator in the case of OFDM as shown in FIG. 7 (700). The output of the single carrier demodulator is used to measure the symbol timing offset of the reverse link signal using one of the known symbol timing recovery methods known in the art.

In the case where multiple subscriber units are communicating with the base unit, the base unit periodically tunes the digital downconverter to one or more of the carrier frequencies used by each subscriber unit in a sequential manner. In an embodiment with a plurality of single channel demodulators, the multiple demodulators are utilized to obtain symbol timing offsets on a plurality of carrier frequencies simultaneously. If the plurality of carrier frequencies are being used by a plurality of subscriber units simultaneously, the base unit may obtain symbol timing offsets for the plurality of subscriber units simultaneously, rather than sequentially. If the plurality of carrier frequencies are being used by a single subscriber unit, the base unit may obtain a symbol timing offset estimate having improved accuracy by combining the timing offset information form the plurality of demodulators.

Figure 8:
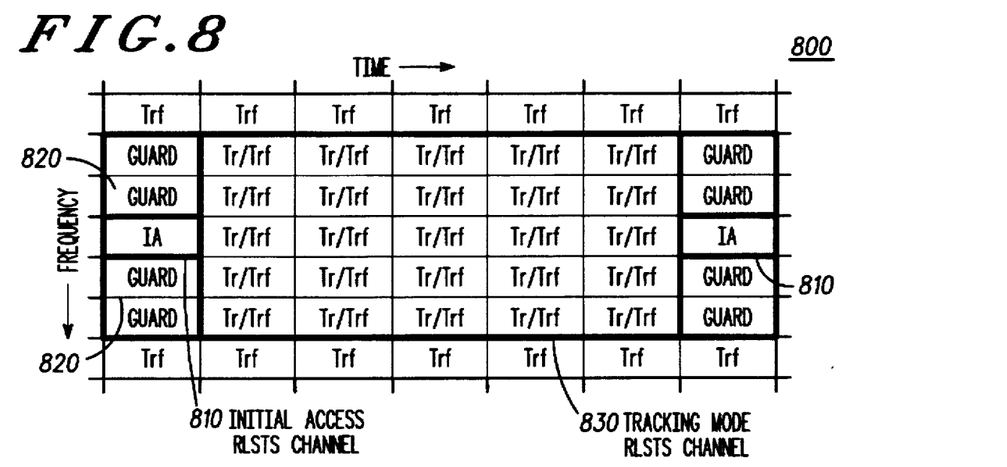
FIG. 8 is a diagram illustrating one embodiment of an initial access reverse link symbol timing synchronization channel format and one embodiment of a tracking mode reverse link symbol timing synchronization channel format in accordance with the present invention.

There are several constraints on the RLSTS channel which must be addressed. As noted earlier, the number of tracking mode RLSTS channel accesses should far exceed the number of RLSTS access for initial access. Also, the location of an RLSTS channel must be known to the subscriber prior to initial access. This problem may be addressed by either placing such channels on predetermined carriers or requiring that the base unit broadcast their location on a regular basis. Also, as noted earlier, the RLSTS channel used for initial access must include several carriers to prevent interfering with the transmissions of other subscriber units on near-by carriers. For purposes of illustration, it is assumed that the reverse link is TDMA system. Further, assume that 2 carriers on both sides of the initial access RLSTS burst are adequate to prevent any significant interference with modulated data carriers on nearby carrier frequencies. One such channel which meets these requirements is shown in FIG. 8, numeral 800. Initial access RLSTS is performed on carrier N in timeslot 0 (810). Carriers N-2, N-1, N+1, and N+2 (820) are present as a guard band within the RLSTS channel in timeslot 0. Tracking mode RLSTS channel access can be performed on any of the carriers N-2 through N+2 in timeslots 1 through 7 (830). Note that these carrier and timeslot combinations can also be used for standard voice or data traffic and are allocated by the base unit. This allows a very flexible allocation of resources. For example, if the system is supporting a large number of low rate voice traffic, and hence many subscriber units are active at the same time, many tracking mode RLSTS channel accesses will be required and most of these timeslots can be dedicated to tracking mode RLSTS. If the system is supporting only a few high data rate subscribers, most of these timeslot-carrier combinations in the RLSTS channel can be allocated for use by the subscribers to support their data transfers. In a wideband OFDM system, several of these RLSTS channels may be interspersed at intervals across the reverse link frequency band. It is recognized by the inventors that several different extensions of this basic concept exist with different divisions of the basic functionality divided among both frequency and time which are essentially similar to the described concepts, and thus are believed to fall within the present invention.

Figure 9:
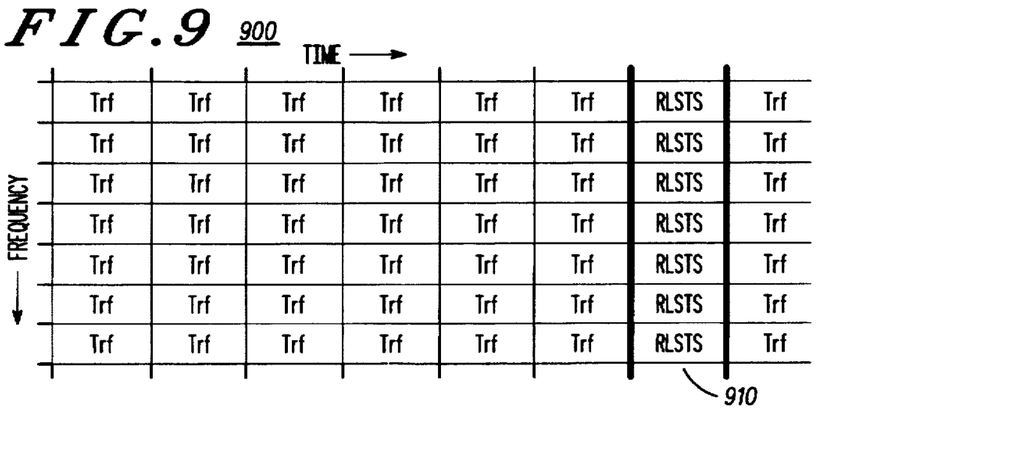
FIG. 9 is a diagram illustrating another embodiment of of an initial access reverse link symbol timing synchronization channel format in accordance with the present invention.

In another preferred embodiment, the RLSTS channel supports the transmission of the RLSTS burst by the subscriber unit across multiple carriers in frequency and a single symbol duration in time as in FIG. 9, numeral 900. In this embodiment, each symbol of the RLSTS message is assigned to a distinct carrier frequency, and the RLSTS burst is transmitted over one symbol time duration using OFDM. In this embodiment the RLSTS channel (910) may comprise a number of carriers greater than or equal to the number of symbols in the RLSTS message and time intervals having a duration greater than a symbol duration, with the time intervals allocated as one time interval per frame. To prevent interference with other subscriber unit transmissions, the time intervals must have a duration greater than a symbol duration. A preferred time duration is two symbol durations as long the round trip propagation delay is less than a symbol duration. The time interval duration must be increased if the round trip propagation delay is greater than a symbol duration. A RLSTS channel (910) in accordance with this embodiment is shown in FIG. 9.

Figure 2:
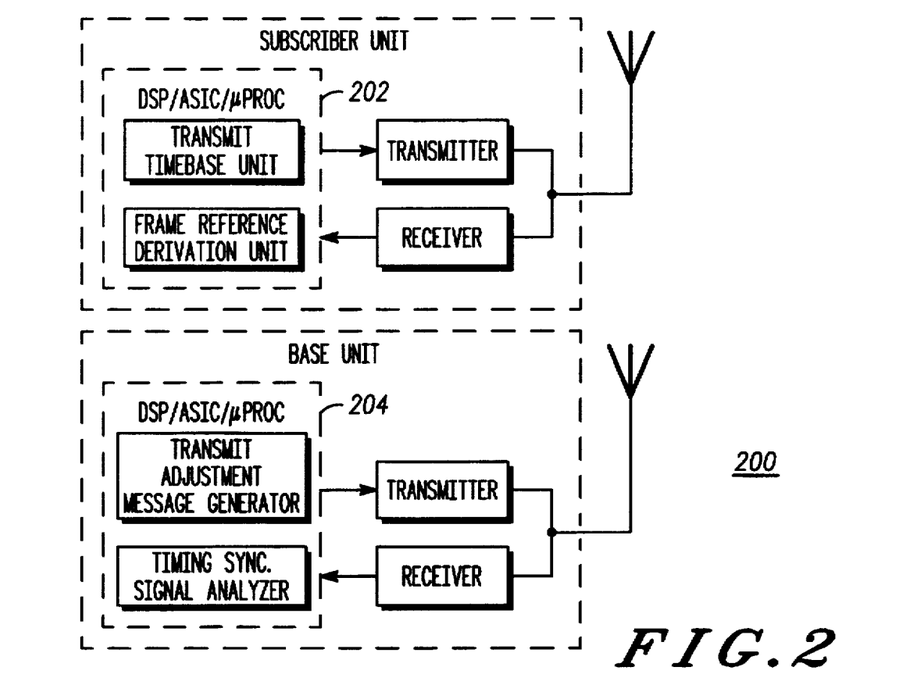
FIG. 2 is a block diagram of a DSP/ASIC/microprocessor for a base unit and a subscriber unit of a two-way communication system utilizing a reverse link symbol timing synchronization scheme in accordance with the present invention.

The functions described in the RSLTS method may easily be implemented with a number of commonly available technologies including DSPs, ASICs, microprocessors (202, 204) and the like, as shown in FIG. 2, numeral 200.

We claim:

1. A communication system including:
   A) a base unit, for transmitting a forward link signal, receiving a multicarrier reverse link signal, and determining a timing offset for signals received on a reverse link timing synchronization channel, wherein the reverse link synchronization channel comprises a plurality of adjacent reverse link carrier frequencies that are utilized by a subscriber unit which tranmits a multicarrier signal to facilitate reverse link multicarrier signal symbol timing synchronization, and
   B) a plurality of subscriber units which transmit multicarrier signals, for receiving a forward link signal, transmitting a reverse link symbol timing synchronization burst on a reverse link timing synchronization channel wherein the reverse link timing synchronization channel comprises a plurality of adjacent reverse link carrier frequencies that are utilized by each subscriber unit, and adjusting a timing reference for transmitting signals to facilitate reverse link timing synchronization.

2. The communication system of claim 1 wherein the reverse link timing synchronization channel further includes predetermined time intervals.

3. The communication system of claim 1 wherein access by each subscriber unit of the reverse link timining synchronization channel is contention-based.

4. The communication system of claim 1 wherein access by each subscriber unit of the reverse link timing synchronization channel occurs on a recurring schedule base.

5. A communication system including:
   A) a base unit, for transmitting a forward link signal, receiving a multicarrier reverse link signal, and determining a timing offset for signals received on a reverse link timing synchronization channel, wherein the synchronization channel comprises a plurality of adjacent reverse link carrier frequencies that are utilized by a subscriber unit that transmits a multicarrier signal to facilitate reverse link symbol timing synchronization, and
   B) a plurality of subscriber units which transmit multicarrier signals, for receiving a forward link signal, transmitting a reverse link symbol timing synchronization burst on a first reverse link timing synchronization channel wherein the first reverse link timing synchronization channel comprises predetermined time intervals and a plurality of adjacent reverse link carrier frequencies to facilitate initial reverse link timing synchronization, and uses a second reverse link timing synchronization channel comprising predetermined time intervals and at least one reverse link carrier frequency, and adjusting a timing reference for transmitting signals, to facilitate tracking updates of reverse link timing synchronization.

6. The communication system of claim 5 wherein the reverse link timing synchronization channel further includes predetermined time intervals.

7. The communication system of claim 5 wherein access by each subscriber unit of the reverse link timing synchronization channel is contention-based.

8. The communication system of claim 5 wherein access by each subscriber unit of the reverse link timing synchronization channel occurs on a recurring schedule base.

9. A subscriber unit that transmits multicarrier signals including:

(A) a reverse link timing synchronization signal generator, coupled to a transmitter, for generating a formatted reverse link symbol timing synchronization message for a reverse link timing synchronization channel, with the reverse link timing synchronization channel having at least a plurality of adjacent reverse link carrier frequencies, and for generating a reverse link symbol timing synchronization burst containing the formatted timing synchronization message, B) a timing reference adjustment unit, coupled to the transmitter, a receiver, and the reverse link timing synchronization signal generator, for adjusting a transmit timing of the reverse link signal in response to a timing offset message from a forward link received signal, C) the transmitter, coupled to the reverse link timing synchronization signal generator and the timing reference adjustment unit, for transmitting multicarrier reverse link signals including the reverse link timing synchronization signal, and:

D) the receiver, coupled to the timing reference adjustment unit, for receiving a forward link signal containing the timing offset message.

10. The subscriber unit of claim 9 wherein the reverse link timing synchronization channel further includes predetermined time intervals.

11. The subscriber unit of claim 9 wherein access by each subscriber unit of the reverse link timining synchronization channel is contention-based.

12. The subscriber unit of claim 9 wherein access by each subscriber unit of the reverse link timing synchronization channel occurs on a recurring schedule base.

13. A base unit for receiving multicarrier signals including:

(A) a receiver, for receiving a reverse link symbol timing synchronization burst containing a reverse link symbol timing synchronization message received on a reverse link timing synchronization channel, with the reverse link timing synchronization channel having a plurality of adjacent reverse link carrier frequencies, B) a reverse link timing synchronization signal analyzer, coupled to the receiver, for measuring a timing of a reverse link timing synchronization message, and for comparing the measured timing to a predetermined reference timing to determine a timing offset value, C) a timing offset message generator, coupled to the reverse link timing synchronization signal analyzer, for generating a timing offset message responsive to the timing offset value, and D) a transmitter, coupled to the timing offset message generator, for transmitting a forward link signal containing the timing offset message.

14. The base unit of claim 13 wherein the reverse link timing synchronization channel further includes predetermined time intervals.

15. The base unit of claim 13 wherein access by a subscriber unit of the reverse link timining synchronization channel is contention-based.

16. The base unit of claim 13 wherein access by a subscriber unit of the reverse link timing synchronization channel occurs on a recurring schedule base.

17. The subscriber unit of claim 9 wherein the reverse link symbol timing synchronization message includes a code to identify the subscriber unit.

18. The subscriber unit of claim 9 wherein the subscriber unit transmits the reverse link symbol timing synchronization burst on a single carrier of the reverse link timing synchronization channel.

19. The subscriber unit of claim 9 wherein the subscriber unit transmits the reverse link symbol timing synchronization burst in a single symbol time interval of the reverse link timing synchronization channel.

20. The base unit of claim 13 further including a tracking mode single carrier demodulator, coupled to the receiver, which, according to a modulated data carrier frequency sequence schedule, demodulates a single modulated data carrier of a received multicarrier reverse link signal and estimates a symbol timing offset of the modulated data carrier, wherein different single modulated data carriers are demodulated at different time intervals in accordance with the modulated data carrier frequency sequence schedule.

21. The base unit of claim 13 further including a reverse link symbol timing synchronization single carrier demodulator, coupled to the receiver, which demodulates a single carrier of a reverse link symbol timing synchronization burst received on the reverse link timing synchronization channel and estimates a symbol timing offset of the reverse link symbol timing synchronization burst.

22. A method for reverse link symbol timing synchronization of multicarrier signals including the steps of:

A) generating a formatted reverse link symbol timing synchronization message for a reverse link timing synchronization channel, with the reverse link timing synchronization channel having at least a plurality of adjacent reverse link carrier frequencies, and for generating a reverse link symbol timing synchronization burst containing the formatted timing synchronization message, B) adjusting a transmit timing of a reverse link signal in response to a timing offset message from a forward link received signal, C) transmitting multicarrier reverse link signals including the reverse link timing synchronization signal, and D) receiving a forward link signal containing the timing offset message.

23. The method of claim 22 wherein the reverse link timing synchronization channel further includes predetermined time intervals.

24. The method of claim 22 wherein access by each subscriber unit of the reverse link timining synchronization channel is contention-based.

25. The method of claim 22 wherein access by each subscriber unit of the reverse link timing synchronization channel occurs on a recurring schedule base.

* * * * *